(12) United States Patent
Anderson et al.

(10) Patent No.: US 7,877,712 B2
(45) Date of Patent: Jan. 25, 2011

(54) SYSTEM FOR AND METHOD OF VERIFYING IC AUTHENTICITY

(75) Inventors: Brent Alan Anderson, Jericho, VT (US); Edward Joseph Nowak, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 11/744,980

(22) Filed: May 7, 2007

(65) Prior Publication Data

US 2008/0282209 A1    Nov. 13, 2008

(51) Int. Cl.
*G06F 17/50* (2006.01)
(52) U.S. Cl. .............................. 716/4; 716/5
(58) Field of Classification Search ................. 716/4–6
See application file for complete search history.

(56) References Cited

U.S. PATENT DOCUMENTS

| | | | |
|---|---|---|---|
| 5,644,636 A | 7/1997 | Fernandez | |
| 6,621,425 B2 | 9/2003 | Maeda | |
| 6,678,823 B1 | 1/2004 | Fernandez et al. | |
| 6,880,136 B2 * | 4/2005 | Huisman et al. | 716/4 |
| 7,055,118 B1 * | 5/2006 | Kamepalli et al. | 716/5 |
| 7,509,546 B2 * | 3/2009 | Rajski et al. | 714/718 |

FOREIGN PATENT DOCUMENTS

WO    WO0049538    8/2000

* cited by examiner

*Primary Examiner*—Jack Chiang
*Assistant Examiner*—Binh C Tat
(74) *Attorney, Agent, or Firm*—David Cain

(57) ABSTRACT

A verification system disclosed herein uses the unique signatures of an IC to perform authentication of the IC after the IC is shipped to a customer. The verification system records the fingerprint and associated IC identifier with the fingerprint into a data structure. The data structure is supplied to the customer for use in the customer's own security systems. When an IC interfaces with the customer's system, the verification system requests the IC's identifier and selects a data structure corresponding to that IC identifier. The verification system then performs a test on the IC (e.g. remotely operates the IC at 1V), records the resulting data and compares the test results with the corresponding data in the data structure. If a predetermined condition is satisfied then the IC is verified to be authentic. If not, the verification system responds, for example, by flagging the customer's security system.

10 Claims, 4 Drawing Sheets

140

| Chip ID | Test Type | Data |
|---------|-----------|------|
| A | 1 | xxx |
| A | 2 | yyy |
| A | 3 | zzz |
| B | 1 | aaa |
| . | . | . |
| . | . | . |
| . | . | . |

150

```
1 0 1 0 2 1 0 2 2 0 2 2
1 1 2 1 0 0 0 1 0 1 1 0
0 0 1 2 2 2 2 1 0 1 1 2
2 1 2 2 2 1 1 1 0 1 1 2
1 1 2 2 1 0 2 2 1 0 0 2
2 2 1 0 1 2 0 2 1 1 1 2
0 0 2 0 2 0 1 1 1 2 0 0
1 0 2 2 2 2 0 2 0 1 1 0
```

SYSTEM FOR AND METHOD OF VERIFYING IC AUTHENTICITY

BACKGROUND OF THE INVENTION

1. Field of the Invention

This invention relates to verifying the authenticity of integrated circuits (IC's) and more specifically to recording a unique signature from an IC at manufacturing then using that signature to perform verification as necessary.

2. Background of the Invention

Counterfeit IC's have become a significant problem for nearly every industry that relies on electronics for data communication, data management, and data processing. For example, the banking industry uses IC's for security purposes that need to be safe from counterfeiting; government programs, such as defense, have a high security requirement on circuitry to prevent technology from falling into adverse possession; and high volume consumer electronics with large profit margins are subject to counterfeiting such as gaming boxes, routers, and cellular telephones.

Some counterfeit IC's have additional logic which secretly routes data from the IC to adverse persons such as hackers and snoopers who can obtain secure information such as credit card numbers, account numbers, and passwords from the IC's.

Counterfeiters typically reverse engineer an existing IC by processes such as delamination or delayering. The authentic IC is delayered one layer at a time and the circuit configuration of that particular layer is copied as a new schematic layout which can be used for manufacturing the counterfeit IC. Other reverse engineering techniques include the use of scanning electron microscopes (SEM's) and backside imaging which requires that the chip be polished very thinly so that the photon emission from electrons can be seen through the substrate and recorded.

BRIEF SUMMARY OF THE INVENTION

Based on the foregoing, it is an object of the invention to provide a mechanism for verifying integrated circuit authenticity and identifying counterfeit IC's.

The invention takes advantage of process variation in every integrated circuit (IC). Process variation creates a unique signature or "silicon fingerprint" associated with each IC. Since manufacturing processes vary (albeit slightly) for each die on a wafer, no two die have the same silicon fingerprint. A verification system disclosed herein uses the unique signatures for an IC to perform authentication of the IC after the IC is shipped to a customer. The verification system records the fingerprint and associated IC identifier with the fingerprint into a data structure. The data structure is supplied to the customer for use in the customer's own security systems. When an IC interfaces with the customer's system, the verification system requests the IC's identifier and selects a data structure corresponding to that IC identifier. The verification system then performs a test on the IC (e.g. remotely operates the IC at 1V), records the resulting data and compares the test results with the corresponding data in the data structure. If a predetermined condition is satisfied (e.g. a percentage of the test results data matches the corresponding data in the data structure), then the IC is verified to be authentic. If not, the verification system responds, for example, by flagging the customer's security system or deactivating the system in which the counterfeited IC is operating.

DETAILED DESCRIPTION

Figure 1:
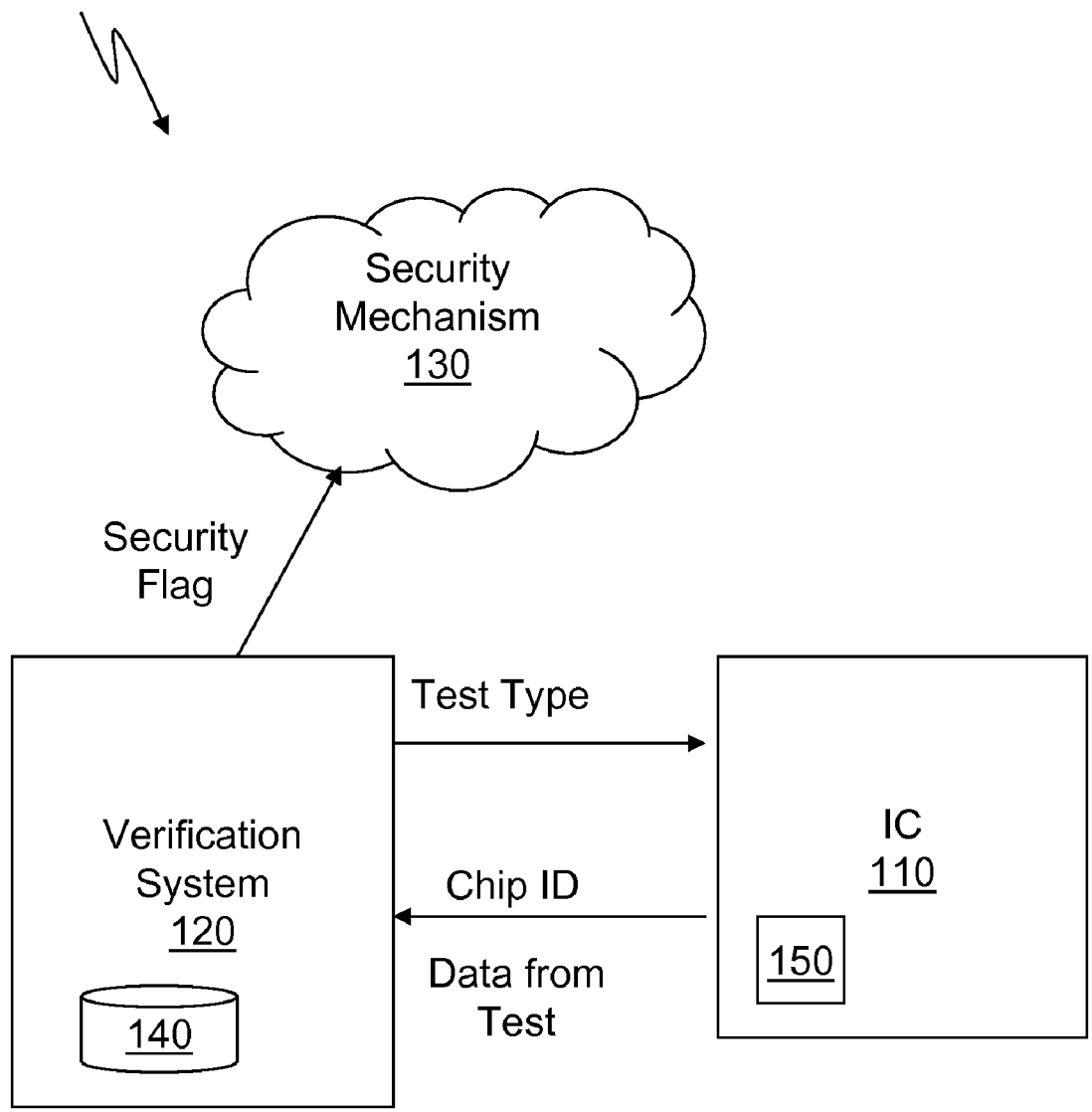
FIG. 1 shows a system for authenticating integrated circuits according to an embodiment of the present invention.
Figure 4:
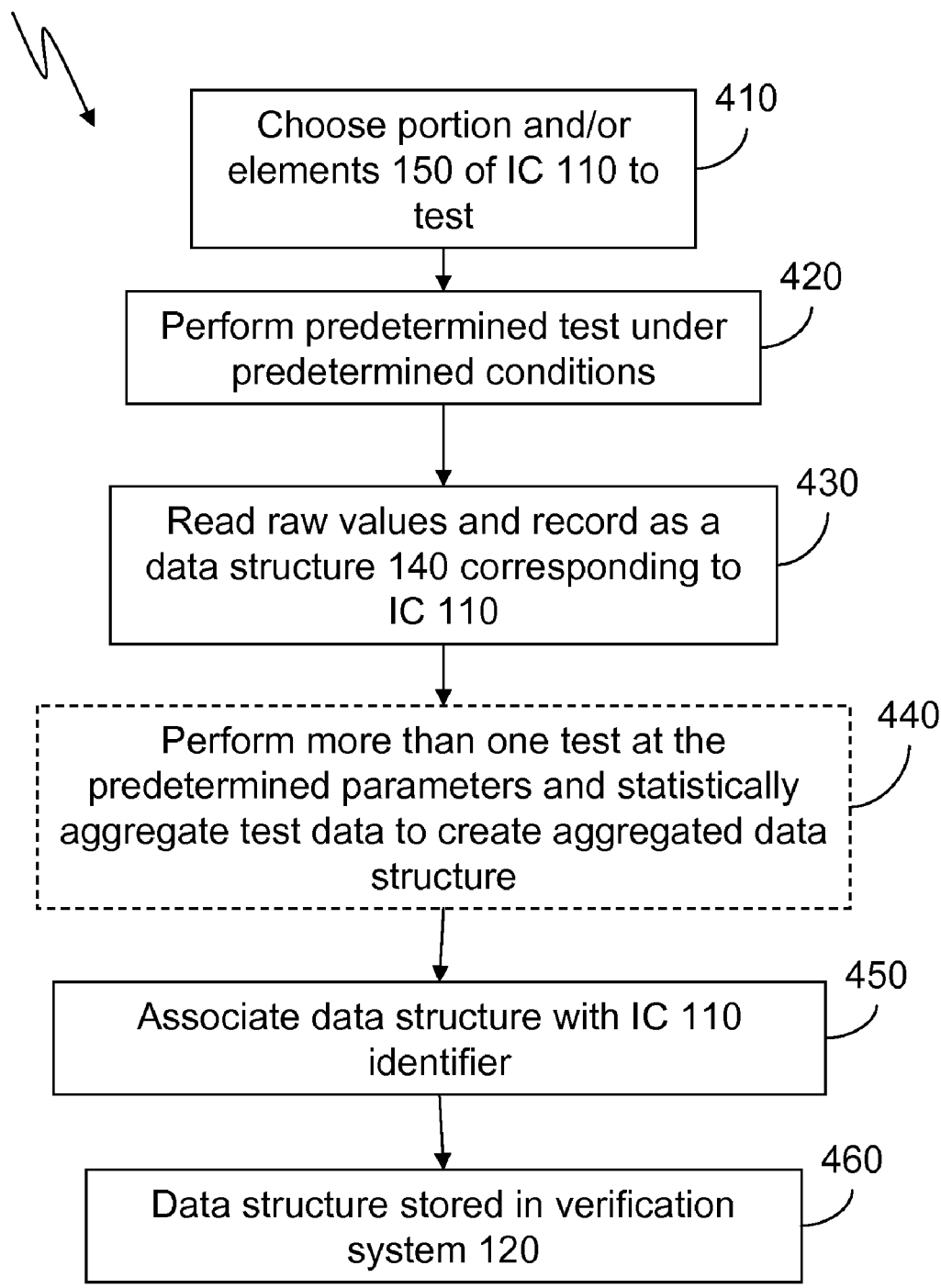
FIG. 4 is a flow diagram of a method of recording a unique signature from an authentic IC into a data structure for verification.

FIG. 1 shows a system 100 which comprises a verification system 120, a security mechanism 130 and a chip 110, which is a chip to be authenticated. Verification system 120 further includes a data structure 140. Chip 110 further includes an element 150 which provides data to verification system 120. Data structure 140 includes data that was obtained from an IC at the manufacturer under various testing conditions. For example, tests may be conducted such that the IC is run under various voltage conditions, e.g. 0.5V and 1V, and parametric data from element 150 is read out and stored as data structure 140 for each test. The tests may be run more than once under each condition and the resulting test data averaged to ensure accuracy of later testing comparisons. Further explanation of the process to generate data structure 140 is shown in FIG. 4.

Element 150 may be a portion of bits of memory (e.g. SRAM, DRAM, etc.), a plurality of scan chain latches, a plurality of logic circuits, or other elements and devices that provide unique characteristic signatures under various testing conditions. One of ordinary skill in the art can appreciate the many elements and combination of elements that could be used to obtain data from IC 110 and thus obtain its unique silicon fingerprint.

In operation, verification system 120 obtains an identifier from IC 110 and retrieves the corresponding data structure 140. Verification system 120 chooses a portion of data structure 140 to use as the comparison data for verification. Verification system 120 operates IC 110 at a state corresponding to the state in which IC 110 was operated during the original test at the manufacturer. For example, if the portion of data structure 140 includes data which was recorded when IC 110 was operated at 1V, then verification system 120 operates IC 110 at 1V during the verification process. IC 110 sends the resulting test data to verification system 120. Verification system 120 compares the test data to the corresponding portion of data structure 140 and determines whether IC 110 is authentic based on the comparison.

Figure 2A:
FIG. 2a is an example data structure for use in the present invention.

FIG. 2a shows an example portion of data structure 140. Data structure 140 comprises information related to chip ID's, the type of test run at the manufacturers for that particular chip and the data that was recorded from the chip during those tests. For example, for chip A run under testing conditions, or test type 1, yielded data xxx and under test type 2 yielded data yyy.

Figure 2B:
FIG. 2b is an example of test data corresponding to elements in the IC resulting from a particular operating state of the IC.

FIG. 2b shows an example element 150. In this example, element 150 is a memory which yields the data shown when operated under various conditions. As an example, some bits may read out as '0's, others as '1's and still others at a metastable value '2' when element 150 is operated under a specific condition, such as a low voltage condition for example.

Figure 3:
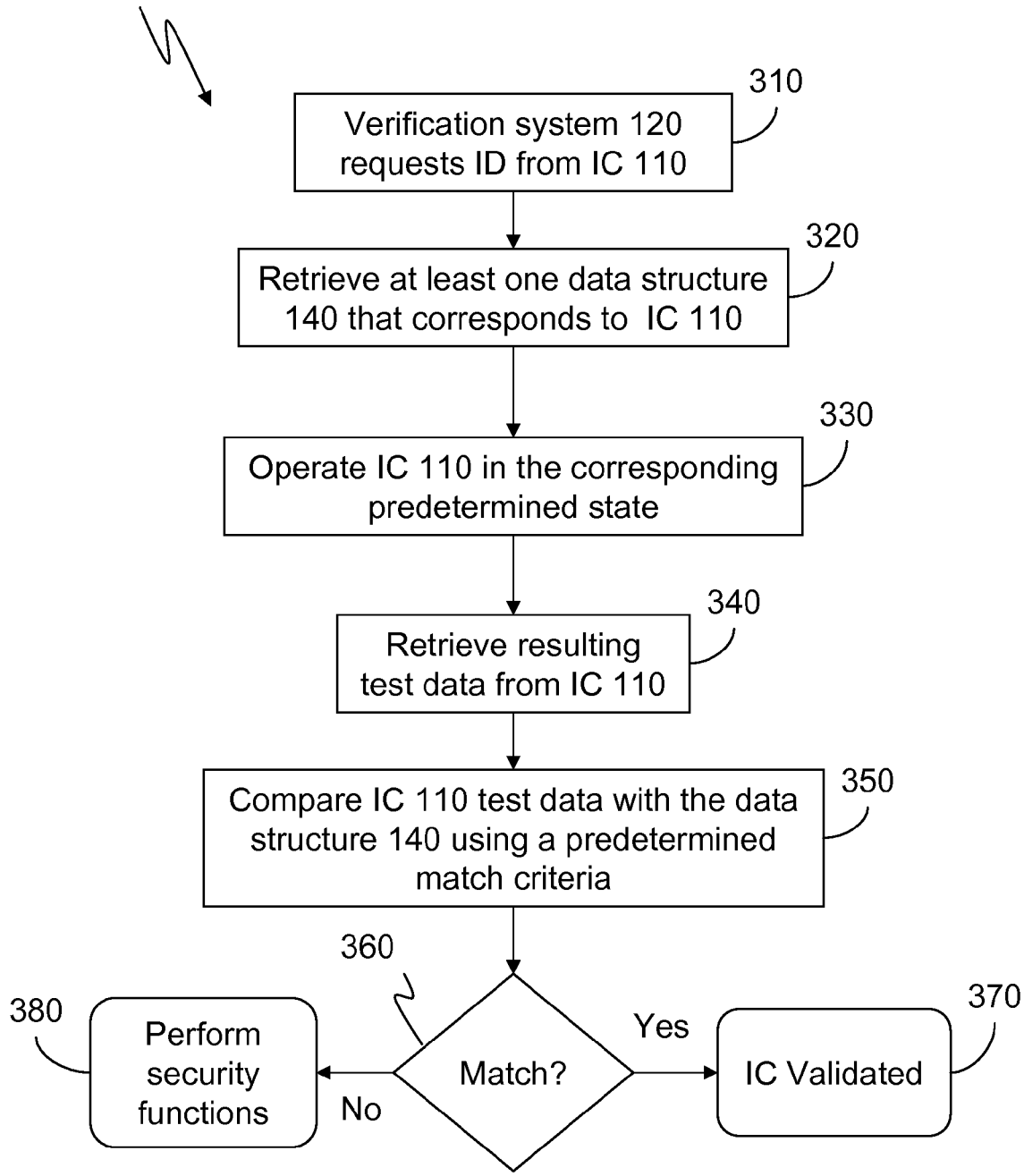
FIG. 3 is a flow diagram of the verification process according to an embodiment of the present invention.

FIG. 3 shows a method 300 of verifying IC 110. In step 310, verification system 120 requests the ID from IC 110 and proceeds to step 320. In step 320, verification system 120 retrieves at least one data structure 140 or portion of a data structure 140 that corresponds to IC 110. Retrieval may include a random selection of data structure 140 corresponding to the ID from IC 110 or may follow a specific programmed algorithm for choosing the corresponding comparison data structure 140. In step 330, verification system 120 operates IC 110 in the corresponding predetermined state (i.e. operating conditions) which was used to generate that particular data structure 140 from the authentic IC 110.

In step 340, method 300 retrieves the resulting test data from IC 110 and proceeds to step 350. In step 350, verification system 120 compares IC 110 test data with data structure 140 using a predetermined match criteria. For example, the match criteria may be dependent on the security level, e.g. anything greater than a 90% match for a lower security level vs. 98.5% match for a higher security level requirement. Another example criteria may be a 100% match for a select subset of element 150 (e.g. 3 specific memory bits). As can be appreciated by one of ordinary skill in the art, there are many match criteria configurations and structures that can be used without deviating from the spirit and scope of the invention. Method 300 proceeds to step 360.

In decision step 360, verification system 120 determines whether the match criteria has been satisfied; if yes, method 300 proceeds to step 370, in which IC 110 is verified to be authentic. If no, method 300 proceeds to step 380.

In step 380, method 300 performs one or more security functions. These functions may range, for example, from sending a flag signal to a security mechanism 130, or disabling IC 110, to disabling the entire system in which IC 110 is operating. One of ordinary skill in the art can appreciate various security functions which will accomplish the task of preventing a counterfeit IC from harming the system or its users.

FIG. 4 is a method 400 of obtaining and recording unique data for IC 110 to be used in verification system 120. In step 410, method 400 chooses a portion of IC 110 (e.g. element 150) to test. In step 420, method 400 performs the predetermined test in the predetermined state (e.g. under predetermined operating conditions) to detect the natural default states of element 150 under the given operating conditions. Predetermined tests (i.e. test types) may include, for example, operating IC 110 at varying voltages or well biases (e.g. back biases), predisposing a read and write disturb, precharging bitlines to a specific voltage (e.g. ground), or using decay elements (e.g. creating a charge decay map of retention time) to use as comparison data.

In step 430, method 400 reads the raw values of the element 150 test results and records the corresponding test type along with the corresponding test result data from element 150 in test structure 140. Method 400 optionally proceeds to step 440. In optional step 440, method 400 performs more than one test under the predetermined state and statistically aggregates the test data to create an aggregated data set for recording into data structure 140. Other means of aggregating, averaging or otherwise combining data may also be used without deviating from the spirit and scope of the invention.

In step 450, method 400 associates the IC 110 identifier with data structure 140 and proceeds to step 460. In step 460, method 400 stores data structure 140 in verification system 120 so that it can be used to later authenticate IC 110.

The above description and drawings are only to be considered illustrative of exemplary embodiments, which achieve the features and advantages of the invention. It should be appreciated by one of ordinary skill in the art that modification and substitutions to IC elements, types of tests performed, operating conditions, algorithms for comparisons, and/or mechanisms for security functions can be made without departing from the spirit and scope of the invention. Accordingly, the invention is not to be considered as being limited by the foregoing description and drawings.

What is claimed is:

1. A method of verifying the authenticity of a physical integrated circuit (IC) comprising the steps of:
   electrically connecting the physical IC to a verification system;
   sending an identifier from said physical IC to be verified to the verification system, said identifier unique to the physical IC;
   operating the physical IC in a predetermined state to generate test data based on information stored in a data structure of said verification system and storing the test data on the physical IC chip;
   comparing the test data stored on the physical IC to test data previously stored in the data structure;
   determining whether the physical IC is an authentic IC or a potentially counterfeit IC based on a result of the comparing step satisfying a predetermined condition;
   selecting a portion of the data structure from which to verify the physical IC; and
   generating the test data from a plurality of elements within the physical IC corresponding to the portion of the data structure.

2. The method of claim 1, wherein the elements comprise a plurality of memory bits.

3. The method of claim 1, wherein the elements comprise a plurality of scan chain latches.

4. The method of claim 1, wherein the elements comprise a plurality of logic circuits.

5. The method of claim 1, wherein the predetermined condition is a percentage of test data which matches the data structure.

6. The method of claim 1, further comprising the step of using a plurality of predetermined computational elements to modify the test data prior to the step of comparing.

7. The method of claim 1, further comprising the step of:
   performing a predetermined security function if the physical IC is not the authentic IC.

8. The method of claim 7, wherein the predetermined security function comprises sending a flag signal to a security mechanism.

9. The method of claim 7, wherein the predetermined security function comprises disabling a system in which the physical IC is operating.

10. The method of claim 7, wherein the predetermined security function comprises disabling only the physical IC.

* * * * *